US012174880B2

(12) United States Patent
Yang et al.

(10) Patent No.: US 12,174,880 B2
(45) Date of Patent: Dec. 24, 2024

(54) METHOD FOR SEARCHING TARGET CONTENT, AND ELECTRONIC DEVICE AND STORAGE MEDIUM (71) Applicant: BEIJING ZITIAO NETWORK TECHNOLOGY CO., LTD., Beijing (CN)

(72) Inventors: Jingsheng Yang, Beijing (CN); Kojung Chen, Beijing (CN); Cheng Qian, Beijing (CN); Mengyuan Xiong, Beijing (CN); Xiang Zheng, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/148,064

(22) Filed: Dec. 29, 2022

(65) Prior Publication Data

US 2023/0140442 A1 May 4, 2023

Related U.S. Application Data (63) Continuation of application No. PCT/CN2021/115261, filed on Aug. 30, 2021.

(30) Foreign Application Priority Data

Sep. 29, 2020 (CN) .......................... 202011052041.7

(51) Int. Cl.
*G06F 16/483* (2019.01)
*G06F 16/48* (2019.01)

(52) U.S. Cl.
CPC .......... *G06F 16/483* (2019.01); *G06F 16/489* (2019.01)

(58) Field of Classification Search
None
See application file for complete search history.

(56) References Cited

U.S. PATENT DOCUMENTS 8,682,672 B1 * 3/2014 Ha .......................... H04N 7/15
704/235
9,824,147 B1  11/2017 Gilliland et al.
(Continued)

FOREIGN PATENT DOCUMENTS

CN   201421609 Y   3/2010
CN   107071554 A   8/2017
(Continued)

OTHER PUBLICATIONS

First Office Action issued Sep. 7, 2021 in Chinese Application No. 202011052041.7, with English translation (19 pages).

(Continued)

*Primary Examiner* — Mark D Featherstone
*Assistant Examiner* — Navneet Gmahl (57) ABSTRACT Provided are a method and apparatus for searching target content, an electronic device, and a storage medium. The method includes acquiring search content to be processed in a search content editing control; determining at least one piece of associated content to be searched corresponding to the search content to be processed and using both the at least one piece of associated content to be searched and the search content to be processed as target search content; and searching for target content matching with each piece of the target search content from subtitle information.

20 Claims, 3 Drawing Sheets (56) References Cited

U.S. PATENT DOCUMENTS

| | | | | |
|---|---|---|---|---|
| 2003/0187632 A1* | 10/2003 | Menich | ............... | H04L 65/4038 704/1 |
| 2005/0086214 A1* | 4/2005 | Seewald | ................. | G06F 40/58 707/E17.073 |
| 2007/0156843 A1* | 7/2007 | Sagen | ................. | H04N 21/278 704/E15.045 |
| 2008/0189099 A1* | 8/2008 | Friedman | ............. | G06F 16/639 704/8 |
| 2008/0281783 A1* | 11/2008 | Papkoff | ............... | G06F 16/4387 |
| 2011/0113357 A1* | 5/2011 | Rosu | ..................... | G06F 16/438 715/764 |
| 2011/0238495 A1* | 9/2011 | Kang | ................. | G06Q 30/0251 705/14.49 |
| 2012/0002520 A1* | 1/2012 | Tanaka | .................. | H04N 5/913 369/47.12 |
| 2012/0236201 A1* | 9/2012 | Larsen | ................. | H04N 21/242 348/468 |
| 2012/0315009 A1* | 12/2012 | Evans | ................ | H04N 21/4828 386/230 |
| 2013/0004141 A1* | 1/2013 | Wu | ......................... | G06F 16/78 386/244 |
| 2014/0147816 A1* | 5/2014 | Ferro | ..................... | G09B 5/065 434/157 |
| 2014/0172863 A1* | 6/2014 | Imbruce | ............. | G06F 16/4393 707/740 |
| 2020/0081922 A1* | 3/2020 | Li | ........................... | G06F 16/45 |
| 2020/0126559 A1* | 4/2020 | Ochshorn | ............ | G11B 27/031 |
| 2020/0126583 A1* | 4/2020 | Pokharel | ............ | G10L 15/1822 |
| 2020/0133948 A1* | 4/2020 | Kopru | .................. | H04L 67/01 |
| 2020/0394271 A1* | 12/2020 | Bihani | .................... | G06F 40/47 |
| 2021/0014575 A1* | 1/2021 | Selfors | ............... | H04N 21/4856 |
| 2021/0173863 A1* | 6/2021 | Collins | ................. | G06F 16/435 |
| 2021/0191603 A1* | 6/2021 | Napolitano | ........... | G06F 16/483 |
| 2021/0266641 A1* | 8/2021 | Selfors | ................... | H04N 21/84 |

FOREIGN PATENT DOCUMENTS

| | | | |
|---|---|---|---|
| CN | 107992545 | A | 5/2018 |
| CN | 109033256 | A | 12/2018 |
| CN | 109246472 | A | 1/2019 |
| CN | 110225387 | A | 9/2019 |
| CN | 110753269 | A | 2/2020 |
| CN | 112163103 | A | 1/2021 |
| IN | 103838751 | A | 6/2014 |
| JP | 10-187735 | A | 7/1998 |
| JP | 2000-020537 | A | 1/2000 |
| JP | 2000-163433 | A | 6/2000 |
| JP | 2012-043422 | A | 3/2012 |
| JP | 2012-128858 | A | 7/2012 |
| JP | 2013-089019 | A | 5/2013 |

OTHER PUBLICATIONS

Second Office Action issued Dec. 1, 2021 in Chinese Application No. 202011052041.7, with English translation (20 pages).
International Search Report mailed Nov. 25, 2021 in International Application No. PCT/CN2021/115261, with English translation (4 pages).
Office action received from Japanese patent application No. 2023-507572 mailed on May 7, 2024, 9 pages (4 pages English Translation and 5 pages Original Copy).
Office action received from Japanese patent application No. 2023507572, mailed on Aug. 20, 2024, 7 pages (3 pages English Translation and 4 pages Original Copy).

* cited by examiner

METHOD FOR SEARCHING TARGET CONTENT, AND ELECTRONIC DEVICE AND STORAGE MEDIUM

CROSS REFERENCE TO RELATED APPLICATION(S)

This is continuation of International Patent Application No. PCT/CN2021/115261, filed on Aug. 30, 2021, which is based on and claims priority to Chinese Patent Application No. 202011052041.7 filed with the China National Intellectual Property Administration (CNIPA) on Sep. 29, 2020, the disclosure of which is incorporated herein by reference in its entirety.

TECHNICAL FIELD

The present disclosure relates to the field of computer technologies, for example, a method and apparatus for searching target content, an electronic device, and a storage medium.

BACKGROUND

When target content is selected from a document or a text, the target content is generally directly selected from the document according to a search condition inputted by a user.

Most pieces of the target content selected through the preceding manner are identical to the search condition, and content associated with the search condition cannot be found.

SUMMARY

The present disclosure provides a method and apparatus for searching target content, an electronic device, and a storage medium so that a search condition is optimized, and when corresponding content is searched according to the optimized search condition, the comprehensiveness of the found content is improved.

The present disclosure provides a method for searching target content. The method includes the steps described below.

Search content to be processed in a search content editing control is acquired.

At least one piece of associated content to be searched corresponding to the search content to be processed is determined and both the at least one piece of associated content to be searched and the search content to be processed are used as pieces of target search content.

Target content matching with each piece of the target search content is searched for from subtitle information.

The present disclosure further provides an apparatus for searching target content. The apparatus includes a search content acquisition module, a target search content determination module, and a target content matching module.

The search content acquisition module is configured to acquire search content to be processed in a search content editing control.

The target search content determination module is configured to determine at least one piece of associated content to be searched corresponding to the search content to be processed and use both the at least one piece of associated content to be searched and the search content to be processed as pieces of target search content.

The target content matching module is configured to search for target content matching with each piece of the target search content from subtitle information.

The present disclosure further provides an electronic device. The electronic device includes one or more processors and a storage apparatus configured to store one or more programs.

The one or more programs, when executed by the one or more processors, cause the one or more processors to perform the preceding method.

The present disclosure further provides a storage medium including computer-executable instructions which, when executed by a computer processor, cause the computer processor to perform the preceding method.

DETAILED DESCRIPTION

Embodiments of the present disclosure are described hereinafter with reference to the drawings. The drawings illustrate some embodiments of the present disclosure, but the present disclosure may be implemented in various manners and should not be limited to the embodiments set forth herein. These embodiments are provided for the understanding of the present disclosure.

The various steps recited in method embodiments of the present disclosure may be performed in a different order and/or in parallel. Additionally, the method embodiments may include additional steps and/or omit the execution of illustrated steps. The scope of the present disclosure is not limited in this respect.

As used herein, the term "include" and variations thereof are intended to be inclusive, that is, "including, but not limited to". The term "according to" is "at least partially according to". The term "an embodiment" refers to "at least one embodiment"; the term "another embodiment" refers to "at least another embodiment"; and the term "some embodiments" refers to "at least some embodiments". Related definitions of other terms are given in the description hereinafter.

Concepts such as "first" and "second" in the present disclosure are merely intended to distinguish one from another apparatus, module, or unit and are not intended to limit the order or interrelationship of the functions performed by the apparatus, module, or unit.

"One" and "a plurality" mentioned in the present disclosure are illustrative, are not intended to limit the present disclosure, and should be understood as "one or more" unless expressed in the context.

Embodiment One

Figure 1:
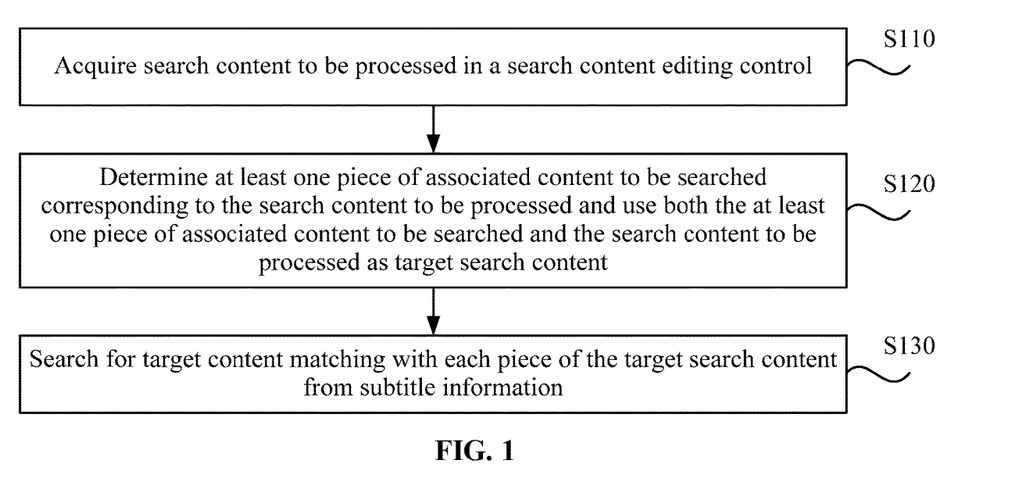
FIG. 1 is a flowchart of a method for searching target content according to embodiment one of the present disclosure.

FIG. 1 is a flowchart of a method for searching target content according to embodiment one of the present disclosure. The embodiment of the present disclosure is applicable to the case where content matching with target search content is searched out from subtitle information. The method may be performed by an apparatus for searching target content, and the apparatus may be implemented in the form of software and/or hardware.

As shown in FIG. 1, the method in this embodiment includes the steps described below.

In S110, search content to be processed in a search content editing control is acquired.

The search content editing control may be displayed on a target page and used for editing the search content. The target page may further include subtitle information. Here, the subtitle information may include a text to be searched, and a manner in which the subtitle information is generated is not limited in this embodiment. A server may acquire the search content edited in the search content editing control and use the acquired search content as the search content to be processed. Optionally, the search content edited in the search content editing control is "searching", and the search content to be processed acquired by the server is "searching".

In this embodiment, the step of acquiring the search content to be processed in the search content editing control includes in the case where it is detected that a control for starting a search is triggered, acquiring the search content to be processed that is edited in the search content editing control; or in the case where it is detected that the search content editing control is triggered, acquiring the search content to be processed that is edited in the search content editing control.

Exemplarily, the search content to be processed may be acquired in at least two manners described below. The search content editing control and the control for starting a search may be included on the target page. Optionally, the control for starting a search may be a control for "confirming" the search. A user may edit corresponding content in the search content editing control, and after the content editing is completed, the user may trigger the control for starting a search, that is, click on the "confirming" control, and the server may acquire the search content to be processed in the search content editing control. Alternatively, it is also feasible that in the case where it is detected that the user triggers the search content editing control, acquisition of the search content edited in the search content editing control is started. If new search content edited by the user is not detected within a preset time period, optionally, within 30 s, the acquired search content is used as the search content to be processed.

In S120, at least one piece of associated content to be searched corresponding to the search content to be processed is determined and both the at least one piece of associated content to be searched and the search content to be processed are used as target search content.

The associated content to be searched is determined according to the search content to be processed. The associated content to be searched may be obtained according to at least one conversion form corresponding to the search content to be processed. For example, the search content to be processed is: "one, two, three", and the associated content to be searched may be obtained according to at least one conversion form of "一, 二, 三". Optionally, the associated content to be searched may be "1, 2, 3", "壹, 貳, 叁", and the like. Both at least one piece of associated content to be searched and the search content to be processed may be used as the target search content.

After the search content to be processed is acquired, at least one piece of associated content to be searched associated with the search content to be processed may be determined, and both the at least one piece of associated content to be searched and the search content to be processed are used as the target search content.

In S130, target content matching with each piece of the target search content is searched for from subtitle information.

Content the same as at least one piece of associated content to be searched and content the same as the search content to be processed are acquired from the subtitle information and used as the target content. Multiple pieces of the target search content may exist, and content that is obtained from the subtitle information and the same as any piece of the target search content is the target content.

Exemplarily, the search content to be processed is "1, 2, 3", and the at least one piece of associated content to be searched in the target search content may be "一, 二, 三" or "壹, 貳, 叁". Each character string of "1, 2, 3", "一, 二, 三", and "壹, 貳, 叁" may be used as a whole, and content completely consistent with any one of the above three is selected from the subtitle information, that is, all the "1, 2, 3", "一, 二, 三", and "壹, 貳, 叁" in the subtitle information are used as the target content.

Optionally, content the same as the target search content is matched from the subtitle information and the matched content is used as the target content. This method has the following advantage: the associated content associated with the search content to be processed may be searched for from the subtitle information, thereby improving the comprehensiveness of the determined target content.

In the technical solution of the embodiment of the present disclosure, when the search content to be processed is acquired, the associated content to be searched associated with the search content to be processed is determined, that is, a search condition is optimized, and when corresponding content is searched for from the subtitle information according to the optimized search condition, the comprehensiveness and accuracy of the determined target content are improved.

Based on the preceding technical solution, after the target content is obtained, the target content is displayed distinctively in the subtitle information.

When the target content is determined from the subtitle information, the target content itself is also one or more elements in the subtitle information and may be displayed distinctively from other elements during displaying, thereby highlighting the filtered target content, so that the user can more intuitively and conveniently find the target content. The distinctive display may be in a color, a font, a background pattern, and other display formats.

Based on the preceding solution, before the search content to be processed in the search content editing control is acquired, the subtitle information also needs to be generated. In this embodiment, the step of generating the subtitle information may be: collecting voice information according to a multimedia data stream; and performing voice recognition on the collected voice information to obtain the subtitle information.

If the voice information represents different language types, when the voice recognition is performed on the collected voice information so as to obtain the subtitle information, according to the voice information, an original language type corresponding to the voice information, and a target translation language type, the subtitle information that is displayed on the target page and corresponds to the target translation language type is generated.

The multimedia data stream may be video stream data corresponding to a real-time interactive interface or video stream data in a video obtained through screen recording after a real-time interactive interface is recorded. The real-time interactive interface is any interactive interface in a real-time interactive application scenario. The real-time interactive application scenario may be implemented by means of the Internet and a computer, for example, an interactive application program implemented through a native program, a World Wide Web (Web) program, or the like.

Multiple users may exist in real-time interaction or in the video obtained through screen recording, a language type used by each user to speak may be the same or different, and when language types used by other speaking users differ greatly from a language type used by the present user, the case where the present user cannot know speaking information of other speaking users may exist.

To solve this problem, voice information of the speaking user may be collected and converted into corresponding subtitle information. To improve reading convenience, the user may trigger a language type selection control on the target page and select a translation language type so as to translate voice information of other speaking users into subtitle information corresponding to the selected translation language type.

The original language type refers to a language type that the user participating in real-time interaction uses when speaking. The target translation language type is a language type that is set by the user on the target page and used for displaying the subtitle information. The subtitle information is translation data corresponding to the voice information. To be convenient for the user to intuitively determine a speaking user and speaking time corresponding to each piece of the translation data from the subtitle information, the subtitle information may display an identity of the speaking user and a speaking timestamp of each piece of the translation data.

Voice data, that is, the voice information, of multiple users participating in an interaction may be collected from the multimedia data stream corresponding to an interaction interface, and the original language type corresponding to the voice information may be recorded. The voice information may be translated from the original language type to the target translation language type, so as to obtain the translation data corresponding to the voice information. The identity of the speaking user and the speaking timestamp corresponding to the translation data and the translation data are used as the subtitle information displayed on the target page.

In this embodiment, the target translation language type may be determined through at least one of the following manners: acquiring a language type preset on a target client as the target translation language type; or acquiring a login address of the target client and determining the target translation language type corresponding to a geographic location where the target client is located according to the login address.

That is, at least two methods for determining the target translation language type are described below. The first manner may be: in the case where it is detected that the user triggers the language type selection control on the target page, that is, in the case where which language type selected by the user to display the subtitle information is detected, determining the language type set by the user and using the set language type as the target translation language type. Exemplarily, in the case where the user triggers the language type selection control, a language type selection list may be popped up on the target page for the user to select from. The user may select any language type. For example, the user triggers a Chinese language type in the language type selection list and clicks on a confirmation button, and a server or a client may determine that the target translation language type is the Chinese language type. That is, the voice information in the multimedia data stream may be converted into Chinese subtitle information which is then displayed on a target page. The second manner may be: in the case where it is detected that the user triggers the language type selection control, acquiring the login address of the client of the user, that is, an Internet Protocol (IP) address of the client, so as to determine a region to which the client belongs according to the login address and use a language type used in the region as the target translation language type. For example, in the case where the user triggers the language type selection control, the login address of the client of the user is acquired, and if the region to which the client belongs is determined to be China according to the login address, the target translation language type is the Chinese language type.

In this embodiment, the voice information in the multimedia data stream is converted into the subtitle information of the target translation language type so that the subtitle information is more in line with reading habits of the user, and the user can quickly understand the content corresponding to the multimedia data stream, thereby improving the interaction efficiency.

After the subtitle information is obtained, a timestamp synchronization association relationship between the subtitle information and the multimedia data stream is established and the subtitle information and the multimedia data stream are displayed on the target page so that in the case where it is detected that one piece of the target content is triggered, a video playing moment corresponding to the one piece of the target content is jumped to.

The timestamp synchronization association relationship may be understood that the multimedia data stream and the subtitle information are synchronized and associated based on time. In the case where one piece of translation data in the subtitle information is triggered, a current timestamp corresponding to the piece of translation data may be determined, and the multimedia data stream corresponding to the current timestamp is jumped to according to the pre-established timestamp synchronization association relationship. For example, the multimedia data stream is acquired according to the video obtained through screen recording, and an audio frame and a video frame corresponding to the current timestamp in the video obtained through screen recording are jumped to. Secondly, when a progress bar of the video obtained through screen recording is dragged to an audio frame and a video frame, the current timestamp corresponding to the audio frame and the video frame may be acquired, and according to the pre-established timestamp synchronization association relationship, the translation data corresponding to the audio frame and the video frame in the subtitle information may be determined. To facilitate the confirmation of the user, the translation data may be displayed distinctively. Optionally, the translation data may be highlighted.

Optionally, if it is detected that one piece of the target content is triggered, the current timestamp of the one piece of the target content is determined; and a playing position corresponding to the current timestamp is jumped to according to the pre-established timestamp synchronization association relationship and the current timestamp.

In the case where it is detected that the user triggers the target content, the current timestamp of the target content may be acquired, and according to the pre-established timestamp synchronization association relationship, the playing position corresponding to the current timestamp is jumped to so that it is convenient for the user to know the mood and state of the speaking user when expressing the voice information including the target content, thereby improving the interaction efficiency.

In the technical solution of this embodiment, the timestamp synchronization association relationship between the multimedia data stream and the subtitle information is established so that synchronization and association between the subtitle information and the multimedia data stream is achieved, and it is convenient for the user to quickly find the position of the corresponding subtitle information in the multimedia data stream and learn the voice information of the speaking user in conjunction with the context, thereby improving the information interaction efficiency.

Embodiment Two

Figure 2:
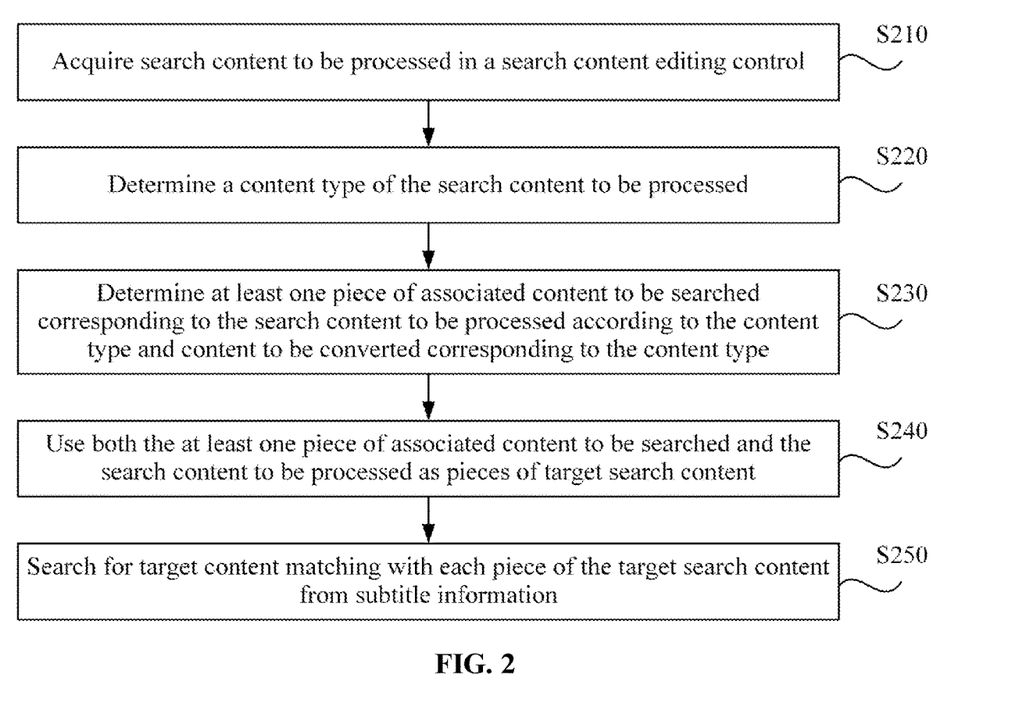
FIG. 2 is a flowchart of a method for searching target content according to embodiment two of the present disclosure.

FIG. 2 is a flowchart of a method for searching target content according to embodiment two of the present disclosure. When the associated content to be searched of the search content to be processed is determined, a content type of the search content to be processed may be acquired, and then the corresponding associated content to be searched is determined according to the content type. Technical terms identical to or corresponding to technical terms in the preceding embodiment are not repeated in this embodiment.

As shown in FIG. 2, the method includes the steps described below.

In S210, search content to be processed in a search content editing control is acquired.

In S220, a content type of the search content to be processed is determined.

In this embodiment, the content type may include a digital type and a foreign language type. Therefore, it is possible to determine which of the preceding types the content type of the search content to be processed is.

Since content types are different and methods for determining the associated content to be searched corresponding to the search content to be processed are also different, the content type of the search content to be processed may be determined before the associated content to be searched is determined.

In S230, at least one piece of associated content to be searched corresponding to the search content to be processed is determined according to the content type and content to be converted corresponding to the content type.

The associated content to be searched is determined according to the search content to be processed and the content type of the search content to be processed.

Optionally, the content type includes the digital type and the step of determining the at least one piece of associated content to be searched corresponding to the search content to be processed according to the content type and the content to be converted corresponding to the content type includes the steps described below.

The content to be converted corresponding to the digital type in the search content to be processed is acquired; at least one conversion form corresponding to the content to be converted is determined and content to be replaced corresponding to the content to be converted is determined according to the at least one conversion form; and the at least one piece of associated content to be searched corresponding to the search content to be processed is determined according to the content to be replaced and the search content to be processed.

The search content to be processed may include only Arabic numerals or may include both Arabic numerals and other content.

If the search content to be processed includes an Arabic numeral, the content type corresponding to the search content to be processed may be the digital type. Correspondingly, the Arabic numeral in the search content to be processed may be the content to be converted of the search content to be processed. The conversion form may be understood as at least one variant form of the content to be converted. Optionally, the variant form may be converting the Arabic numeral into a corresponding capital form of a Chinese character, converting the Arabic numeral into a corresponding low-case form of the Chinese character, converting the Arabic numeral into a corresponding English word, or the like. The conversion form may be preset. For example, the conversion form may be converting the content to be converted into English, Japanese and/or French. The content to be replaced is determined according to at least one conversion form of the content to be converted. According to each piece of the content to be replaced and each piece of the content to be converted, the associated content to be searched corresponding to the search content to be processed is generated. If the search content to be processed includes only an Arabic numeral, the content to be converted is the same as the search content to be processed.

In the preceding manner, at least one conversion form corresponding to the digital type may be determined so as to obtain the associated content to be searched, and when content is searched for from the subtitle information according to the associated content to be searched, the comprehensiveness of the searched target content is improved.

The number of pieces of associated content to be searched is determined by a preset conversion form or a convertible form. Optionally, the search content to be processed includes only an Arabic numeral, five preset conversion forms exist, and five pieces of the content to be replaced are obtained. Correspondingly, the number of pieces of associated content to be searched consists of five pieces of the content to be replaced and one piece of the content to be converted.

Optionally, the content type includes the foreign language type. Here, the content of the "foreign language type" may be content expressed in a language type different from the preset language type. For example, the foreign language type may be at least one preset language type different from the language type currently set in the client of the user, or the foreign language type may be another language type different from the language type of the voice information. The step of determining the at least one piece of associated content to be searched corresponding to the search content to be processed according to the content type and the content to be converted corresponding to the content type includes acquiring the content to be converted corresponding to the foreign language type in the search content to be processed;

determining content to be replaced corresponding to the content to be converted, where the content to be replaced includes a root word and/or an extended word corresponding to the content to be converted; and determining the at least one piece of associated content to be searched corresponding to the search content to be processed according to the content to be replaced and the search content to be processed.

The search content to be processed may include only a foreign language or may include both a foreign language and other content. Optionally, the other content may be Chinese characters, Arabic numerals, symbols, and the like.

Foreign languages may be multiple preset languages such as English, Japanese, and French. If the search content to be processed includes the foreign language, the content type corresponding to the search content to be processed may be the foreign language type. Correspondingly, the foreign language in the search content to be processed may be the content to be converted in the search content to be processed. Since a foreign language word has the active voice, the passive voice, tenses, and the possessive case, when it is detected that the search content to be processed includes search content of the foreign language type, to be convenient to search for corresponding content from the subtitle information, at least one conversion form corresponding to the word may be determined. Optionally, different tenses, the active voice, the passive voice, a root word, or a derivative of the word may be determined, and content obtained after the conversion of the content to be converted according to the at least one conversion form is used as the content to be replaced. According to the content to be replaced and the content to be converted, the associated content to be searched corresponding to the search content to be processed is generated. If the search content to be processed includes only a foreign language, the content to be converted is the same as the search content to be processed.

In the preceding manner, the associated content to be searched associated with the search content to be processed may be quickly found, and then the corresponding target content is found from the subtitle information according to the associated content to be searched, thereby improving the comprehensiveness of the target content determined from the subtitle information.

In this embodiment, the step of determining the at least one piece of associated content to be searched corresponding to the search content to be processed according to the content to be replaced and the search content to be processed includes replacing the content to be converted in the search content to be processed with the content to be replaced to obtain the at least one piece of associated content to be searched corresponding to the search content to be processed.

If the search content to be processed includes only an Arabic numeral, the content to be replaced corresponding to the Arabic numeral may be directly used as the associated content to be searched. Correspondingly, if the search content to be processed includes only a foreign language, the content to be replaced corresponding to the foreign language may be directly used as the associated content to be searched.

If the search content to be processed includes not only an Arabic numeral but also other content besides the Arabic numeral, after at least one piece of the content to be replaced is determined, the content to be converted in the search content to be processed may be replaced with one piece of the content to be replaced, and the search content to be processed after replacement is used as one piece of associated content to be searched. If five pieces of the content to be replaced exist, pieces of the content to be converted may be replaced with the five pieces of the content to be replaced in sequence, and then the associated content to be searched is obtained, that is, five pieces of the associated content to be searched may be obtained.

For a case where the content type is the foreign language type, if the search content to be processed includes not only a foreign language but also other content besides the foreign language, after at least one piece of the content to be replaced is determined, the content to be converted in the search content to be processed may be replaced with one piece of the content to be replaced, and the search content to be processed after replacement is used as one piece of associated content to be searched. If five pieces of the content to be replaced exist, pieces of the content to be converted may be replaced with the five pieces of the content to be replaced in sequence, and then the associated content to be searched is obtained, that is, five pieces of the associated content to be searched may be obtained.

If the search content to be processed includes a foreign language, an Arabic numeral, and other content, the content to be replaced corresponding to the foreign language type and the content to be replaced corresponding to the digital type may be separately determined, a corresponding position in the search content to be processed is replaced with the obtained content to be replaced, and finally multiple pieces of associated content to be searched are obtained.

In S240, both the at least one piece of associated content to be searched and the search content to be processed are used as target search content.

In S250, target content matching with each piece of the target search content is searched for from subtitle information.

In the technical solution of the embodiment of the present disclosure, the content type in the search content to be processed is acquired, corresponding associated content to be searched is determined according to the content type, and the target search content is determined according to the associated content to be searched so that the richness of search conditions is improved, and when searching is performed according to the target search content, the comprehensiveness of the found target content is improved.

Based on the preceding technical solution, the method further includes determining a timestamp of each piece of the target content on a timeline of a multimedia data stream and marking a position corresponding to the timestamp on the timeline.

The timeline corresponds to the multimedia data stream. Optionally, the total duration corresponding to the multimedia data stream is 50 min, and the timeline corresponding to the multimedia data stream is also 50 min.

After the target content is determined, the timestamp corresponding to the target content may be determined according to a sentence to which the target content belongs. After the timestamp is determined, a position of the timestamp on the timeline may be determined and marked. For example, the position is marked with a dot below the timeline or with a triangle, as shown in FIG. 3.

Figure 3:
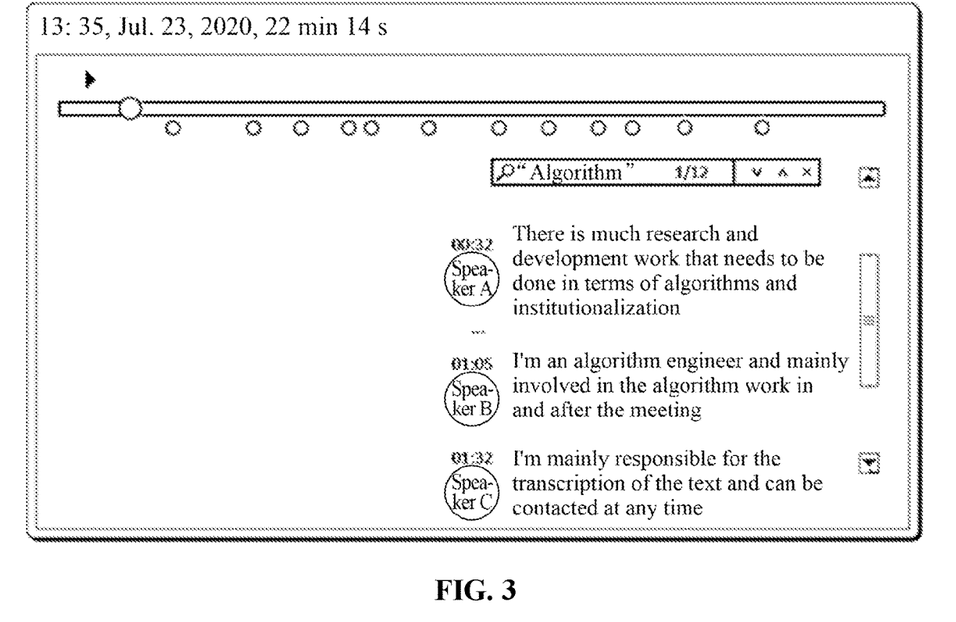
FIG. 3 is a schematic diagram illustrating that target content is displayed corresponding to marks on a timeline according to embodiment two of the present disclosure.

Exemplarily, referring to FIG. 3, the search content edited by the user in the search content editing control is "algorithm", the target content the same as the "algorithm" may be searched out from the subtitle information and displayed distinctively, for example, highlighted, the timestamp of the sentence to which the target content belongs is determined, and marking is performed on the timeline corresponding to the multimedia data stream according to the timestamp. For example, marking is performed with the dot. The color, size, and the like of the mark may be set by the user according to actual requirements and not limited herein.

The number of pieces of the target content may be displayed in the search content editing control. For example, the total number displayed in the search content editing control is 12, as shown in FIG. 3.

In this embodiment, marking the audio frame and the video frame corresponding to the target content on the timeline is advantageous in that the user can clearly determine the position of the target content in the multimedia data stream according to the mark on the timeline, thereby improving the convenience of finding the corresponding target content.

More than one piece of the target content may exist. Correspondingly, more than one mark exists on the timeline. Referring to FIG. 3, the number of pieces of the target content is 12, and the number of marks on the timeline is also 12. To be convenient for the user to determine the ranking of the currently triggered target content among all pieces of the target content, the search content editing control further displays a sequence to which the currently triggered target content corresponds.

Based on the preceding technical solution, the method further includes in the case where it is detected that the target content is triggered, determining a target timestamp corresponding to the target content; and displaying a mark corresponding to the target timestamp distinctively.

The user may trigger any one of pieces of the target content. In the case where it is detected that the user triggers the target content, the timestamp (the target timestamp) corresponding to the target content triggered by the user may be determined, a target mark corresponding to the target timestamp on the timeline may be determined, and the target mark is displayed distinctively from other marks on the timeline, so as to highlight the target mark. For example, the target mark and other marks are displayed distinctively in different colors.

Figure 4:
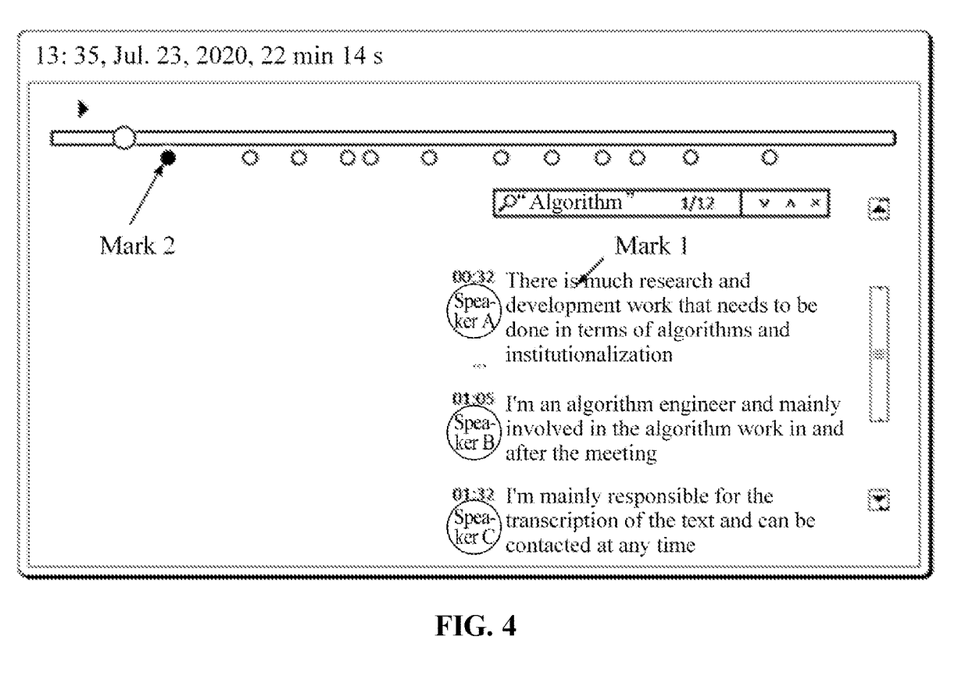
FIG. 4 is a schematic diagram illustrating that a corresponding mark on a timeline is highlighted after target content is triggered according to embodiment two of the present disclosure.

Exemplarily, referring to FIG. 4, in the case where the user triggers the target content corresponding to mark 1, the target timestamp corresponding to the target content corresponding to mark 1 may be determined, and it is determined that a position of the mark 1 on the timeline is a position corresponding to the mark 2 on the timeline, so as to highlight the mark 2.

In this embodiment, in the case where the target content is triggered, distinctively displaying the mark corresponding to the target content on the timeline is advantageous in that the user can learn the position of the triggered target content in the multimedia data stream, thereby improving the accuracy of the audio frame and the video frame corresponding to the target content determined by the user.

Embodiment Three

Figure 5:
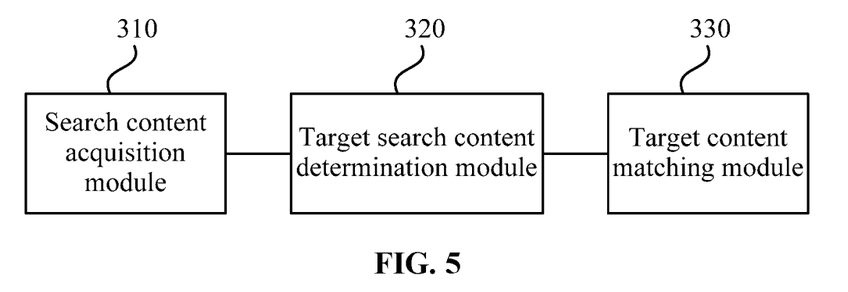
FIG. 5 is a structural diagram of an apparatus for searching target content search according to embodiment three of the present disclosure.

FIG. 5 is a structural diagram of an apparatus for searching target content according to embodiment three of the present disclosure. As shown in FIG. 5, the apparatus includes a search content acquisition module 310, a target search content determination module 320, and a target content matching module 330.

The search content acquisition module 310 is configured to acquire search content to be processed in a search content editing control. The target search content determination module 320 is configured to determine at least one piece of associated content to be searched corresponding to the search content to be processed and use both the at least one piece of associated content to be searched and the search content to be processed as target search content. The target content matching module 330 is configured to search for target content matching with each piece of the target search content from subtitle information.

In the technical solution of the embodiment of the present disclosure, when the search content to be processed is acquired, the associated content to be searched associated with the search content to be processed is determined, and then the content the same as the associated content to be searched is selected from the subtitle information, thereby improving the comprehensiveness and accuracy of the determined target content.

Based on the preceding technical solution, the search content acquisition module 310 is configured to, in the case where it is detected that a control for starting a search is triggered, acquire the search content to be processed that is edited in the search content editing control, or in the case where it is detected that the search content editing control is triggered, acquire the search content to be processed that is edited in the search content editing control.

Based on the preceding technical solution, the target search content determination module 320 is configured to determine the at least one piece of associated content to be searched corresponding to the search content to be processed in the following manners: determining a content type of the search content to be processed; and determining the at least one piece of associated content to be searched corresponding to the search content to be processed according to the content type and content to be converted corresponding to the content type.

Based on the preceding technical solution, the content type includes a digital type and the target search content determination module 320 is configured to determine the at least one piece of associated content to be searched corresponding to the search content to be processed according to the content type and the content to be converted corresponding to the content type in the following manners: acquiring the content to be converted corresponding to the digital type in the search content to be processed; determining at least one conversion form corresponding to the content to be converted and determining content to be replaced corresponding to the content to be converted according to the at least one conversion form; and determining the at least one piece of associated content to be searched corresponding to the search content to be processed according to the content to be replaced and the search content to be processed.

Based on the preceding technical solution, the content type includes a foreign language type and the target search content determination module 320 is configured to determine the at least one piece of associated content to be searched corresponding to the search content to be processed according to the content type and the content to be converted corresponding to the content type in the following manners: acquiring the content to be converted corresponding to the foreign language type in the search content to be processed; determining content to be replaced corresponding to the content to be converted, where the content to be replaced includes a root word and/or an extended word corresponding to the content to be converted; and determining the at least one piece of associated content to be searched corresponding to the search content to be processed according to the content to be replaced and the search content to be processed.

Based on the preceding technical solution, the target search content determination module 320 is configured to determine the at least one piece of associated content to be searched corresponding to the search content to be processed according to the content to be replaced and the search content to be processed in the following manner: replacing the content to be converted in the search content to be processed with the content to be replaced to obtain the at least one piece of associated content to be searched corresponding to the search content to be processed.

Based on the preceding technical solution, the target content matching module 330 is configured to match content the same as each piece of the target search content from the subtitle information and use the matched content as the target content.

Based on the preceding technical solution, the target content is displayed distinctively in the subtitle information.

Based on the preceding technical solution, before the search content to be processed in the search content editing control is acquired, the method further includes determining voice information according to a multimedia data stream; and according to the voice information, an original language type corresponding to the voice information, and a target translation language type, generating the subtitle information that is displayed on a target page and corresponds to the target translation language type.

Based on the preceding technical solution, after the subtitle information is obtained, the method further includes establishing a timestamp synchronization association relationship between the subtitle information and the multimedia data stream and displaying the subtitle information and the multimedia data stream on the target page so that in the case where it is detected that one piece of the target content is triggered, a video playing moment corresponding to the one piece of the target content is jumped to.

Based on the preceding technical solution, the apparatus further includes a mark module configured to determine a timestamp of each piece of the target content on a timeline of the multimedia data stream and mark a position corresponding to the timestamp on the timeline.

Based on the preceding technical solution, the apparatus further includes a highlighted display module configured to, in the case where it is detected that one piece of the target content is triggered, determine a target timestamp corresponding to the one piece of the target content; and distinctively display a target mark corresponding to the target timestamp on the timeline.

The apparatus for searching the target content provided in the embodiment of the present disclosure may perform the method for searching the target content provided in any embodiment of the present disclosure and has function modules and effects corresponding to the method performed.

The multiple units and modules included in the preceding apparatus are just divided according to functional logic but are not limited to such division, as long as the corresponding functions can be implemented. Additionally, names of functional units are just for distinguishing between each other but not to limit the protection scope of the embodiments of the present disclosure.

Embodiment Four

Figure 6:
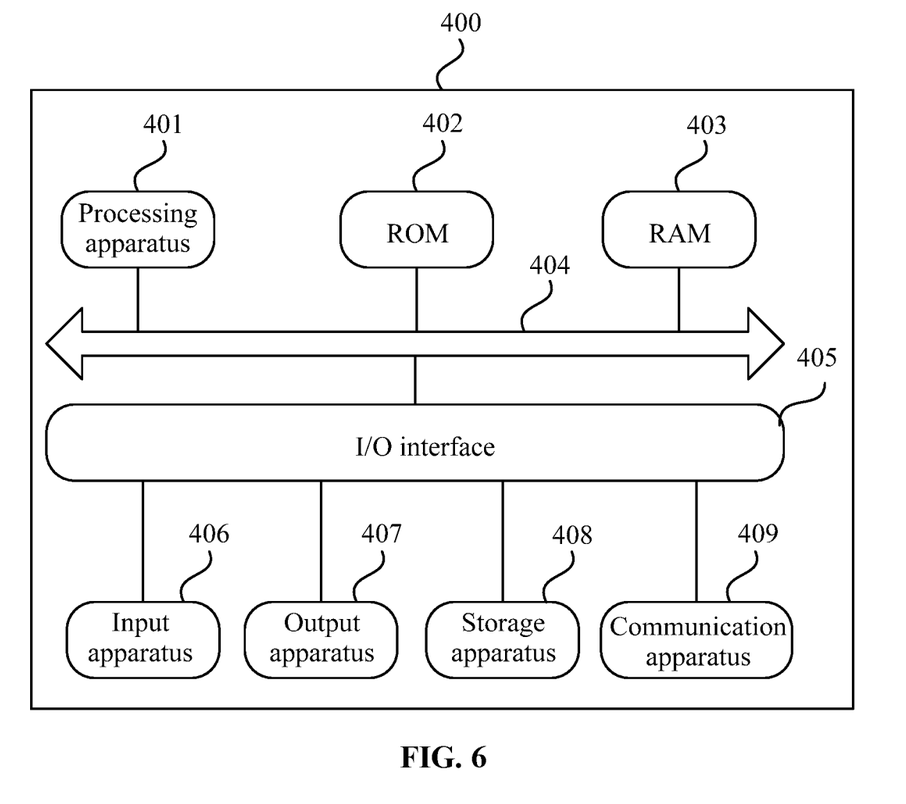
FIG. 6 is a structure diagram of an electronic device according to embodiment four of the present disclosure.

FIG. 6 is a structural diagram of an electronic device 400 (such as a terminal device or a server in FIG. 6) applicable to implementing the embodiments of the present disclosure. The terminal device in the embodiments of the present disclosure may include, but is not limited to, a mobile terminal such as a mobile phone, a laptop, a digital broadcast receiver, a personal digital assistant (PDA), a portable Android device (PAD), a portable media player (PMP) and an in-vehicle terminal (such as an in-vehicle navigation terminal) and a stationary terminal such as a digital television (TV) and a desktop computer. The electronic device shown in FIG. 6 is merely an example and should not impose any limitation to the function and usage scope of the embodiments of the present disclosure.

As shown in FIG. 6, the electronic device 400 may include a processing apparatus (such as a central processing unit and a graphics processing unit) 401. The processing apparatus 401 may execute multiple appropriate actions and processing according to a program stored in a read-only memory (ROM) 402 or a program loaded into a random-access memory (RAM) 403 from a storage apparatus 408. Various programs and data required for the operation of the electronic device 400 are also stored in the RAM 403. The processing apparatus 401, the ROM 402, and the RAM 403 are connected to each other through a bus 404. An input/output (I/O) interface 405 is also connected to the bus 404.

Generally, the following apparatuses may be connected to the I/O interface 405: an input apparatus 406 including, for example, a touchscreen, a touchpad, a keyboard, a mouse, a camera, a microphone, an accelerometer, and a gyroscope, an output apparatus 407 including, for example, a liquid crystal display (LCD), a speaker, and a vibrator, the storage apparatus 408 including, for example, a magnetic tape and a hard disk, and a communication apparatus 409. The communication apparatus 409 may allow the electronic device 400 to perform wireless or wired communication with other devices to exchange data. Although FIG. 6 shows the electronic device 400 having various apparatuses, not all the apparatuses shown here need to be implemented or present. Alternatively, more or fewer apparatuses may be implemented or present.

According to the embodiments of the present disclosure, the process described above with reference to a flowchart may be implemented as a computer software program. For example, a computer program product is included in embodiments of the present disclosure. The computer program product includes a computer program carried in a non-transitory computer-readable medium. The computer program includes program codes for executing the method shown in the flowchart. In such an embodiment, the computer program may be downloaded from a network and installed through the communication apparatus 409, or may be installed from the storage apparatus 408, or may be installed from the ROM 402. When the computer program is executed by the processing apparatus 401, the preceding functions defined in the methods in the embodiments of the present disclosure are implemented.

The electronic device provided in the embodiment of the present disclosure belongs to the same concept as the method for searching the target content provided in the preceding embodiments. For the technical details not described in detail in this embodiment, reference may be made to the preceding embodiments, and this embodiment has the same effects as the preceding embodiments.

Embodiment Five

An embodiment of the present disclosure provides a computer storage medium storing a computer program which, when executed by a processor, performs the method for searching the target content provided in the preceding embodiments.

The computer-readable medium described above in the present disclosure may be a computer-readable signal medium or a computer-readable storage medium or any combination thereof. For example, the computer-readable storage medium may be, but is not limited to, an electrical, magnetic, optical, electromagnetic, infrared, or semiconductor system, apparatus, or device or any combination thereof. An example of the computer-readable storage medium may include, but is not limited to, an electrical connection having one or more wires, a portable computer magnetic disk, a hard disk, a RAM, a ROM, an erasable programmable read-only memory (EPROM), a flash memory, an optical fiber, a portable compact disc read-only memory (CD-ROM), an optical storage device, a magnetic storage device, or any suitable combination thereof. In the present disclosure, the computer-readable storage medium may be any tangible medium including or storing a program. The program may be used by or used in conjunction with an instruction execution system, apparatus or device. In the present disclosure, the computer-readable signal medium may include a data signal propagated on a baseband or as a part of a carrier, and computer-readable program codes are carried in the data signal. The data signal propagated in this manner may be in multiple forms and includes, but is not limited to, an electromagnetic signal, an optical signal or any suitable combination thereof. The computer-readable signal medium may further be any computer-readable medium other than the computer-readable storage medium. The computer-readable signal medium may send, propagate, or transmit a program used by or used in conjunction with an instruction execution system, apparatus or device. The program codes included on the computer-readable medium may be transmitted by any suitable medium, including, but not limited to, a wire, an optical cable, a radio frequency (RF), or any suitable combination thereof.

In some embodiments, clients and servers may communicate using any currently known or future developed network protocol, such as the Hypertext Transfer Protocol (HTTP), and may be interconnected with any form or medium of digital data communication (for example, a communication network). Examples of the communication network include a local area network (LAN), a wide area network (WAN), an inter-network (for example, the Internet), a peer-to-peer network (for example, an ad hoc network), and any network currently known or developed in the future.

The computer-readable medium may be included in the electronic device or may exist alone without being assembled into the electronic device.

The computer-readable medium carries one or more programs which, when executed by the electronic device, cause the electronic device to perform the steps described below.

Search content to be processed in a search content editing control is acquired; at least one piece of associated content to be searched corresponding to the search content to be processed is determined and both the at least one piece of associated content to be searched and the search content to be processed are used as target search content; and target content matching with each piece of the target search content is searched for from subtitle information.

Computer program codes for executing operations in the present disclosure may be written in one or more programming languages or a combination thereof. The preceding programming languages include, but are not limited to, object-oriented programming languages such as Java, Smalltalk, and C++ and may also include conventional procedural programming languages such as C or similar programming languages. Program codes may be executed entirely on a user computer, executed partly on a user computer, executed as a stand-alone software package, executed partly on a user computer and partly on a remote computer, or executed entirely on a remote computer or a server. In the scenario involving the remote computer, the remote computer may be connected to the user computer through any type of network, including a LAN or a WAN, or the connection may be made to an external computer (for example, through the Internet using an Internet service provider).

The flowcharts and block diagrams in the drawings show possible architectures, functions and operations of the system, method and computer program product according to multiple embodiments of the present disclosure. In this regard, each block in the flowcharts or block diagrams may represent a module, a program segment, or part of codes that contains one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system executing a specified function or operation or may be implemented by a combination of special-purpose hardware and computer instructions.

The units involved in the embodiments of the present disclosure may be implemented by software or hardware. The name of a unit/module is not intended to limit the unit in a certain circumstance. For example, a target content determination module may also be described as "a content determination module".

The functions described above herein may be executed, at least partially, by one or more hardware logic components. For example, without limitation, example types of hardware logic components that can be used include a field-programmable gate array (FPGA), an application-specific integrated circuit (ASIC), an application-specific standard product (ASSP), a system-on-chip (SoC), a complex programmable logic device (CPLD), and the like.

In the context of the present disclosure, a machine-readable medium may be a tangible medium that may include or store a program that is used by or used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. Examples of the machine-readable storage medium may include an electrical connection based on one or more wires, a portable computer disk, a hard disk, a RAM, a ROM, an EPROM, a flash memory, an optical fiber, a CD-ROM, an optical storage device, a magnetic storage device, or any suitable combination thereof.

According to one or more embodiments of the present disclosure, example one provides a method for searching target content. The method includes the steps described below.

Search content to be processed in a search content editing control is acquired; at least one piece of associated content to be searched corresponding to the search content to be processed is determined and both the at least one piece of associated content to be searched and the search content to be processed are used as target search content; and target content matching with each piece of the target search content is searched for from subtitle information.

According to one or more embodiments of the present disclosure, example two provides a method for searching target content. The method further includes the following.

Optionally, the step of acquiring the search content to be processed in the search content editing control includes the steps described below.

In the case where it is detected that a control for starting a search is triggered, the search content to be processed that is edited in the search content editing control is acquired; or in the case where it is detected that the search content editing control is triggered, the search content to be processed that is edited in the search content editing control is acquired.

According to one or more embodiments of the present disclosure, example three provides a method for searching target content. The method further includes the following.

Optionally, the step of determining the at least one piece of associated content to be searched corresponding to the search content to be processed includes the steps described below.

A content type of the search content to be processed is determined; and the at least one piece of associated content to be searched corresponding to the search content to be processed is determined according to the content type and content to be converted corresponding to the content type.

According to one or more embodiments of the present disclosure, example four provides a method for searching target content. The method further includes the following.

Optionally, the content type includes a digital type and the step of determining the at least one piece of associated content to be searched corresponding to the search content to be processed according to the content type and the content to be converted corresponding to the content type includes the steps described below.

The content to be converted corresponding to the digital type in the search content to be processed is acquired; at least one conversion form corresponding to the content to be converted is determined and content to be replaced corresponding to the content to be converted is determined according to the at least one conversion form; and the at least one piece of associated content to be searched corresponding to the search content to be processed is determined according to the content to be replaced and the search content to be processed.

According to one or more embodiments of the present disclosure, example five provides a method for searching target content. The method further includes the following.

Optionally, the content type includes a preset language type and the step of determining the at least one piece of associated content to be searched corresponding to the search content to be processed according to the content type and the content to be converted corresponding to the content type includes the steps described below.

The content to be converted corresponding to the preset language type in the search content to be processed is acquired; content to be replaced corresponding to the content to be converted is determined, where the content to be replaced includes a root word and/or an extended word corresponding to the content to be converted; and the at least one piece of associated content to be searched corresponding to the search content to be processed is determined according to the content to be replaced and the search content to be processed.

According to one or more embodiments of the present disclosure, example six provides a method for searching target content. The method further includes the following.

Optionally, the step of determining the at least one piece of associated content to be searched corresponding to the search content to be processed according to the content to be replaced and the search content to be processed includes the step described below.

The content to be converted in the search content to be processed is replaced with the content to be replaced so as to obtain the at least one piece of associated content to be searched corresponding to the search content to be processed.

According to one or more embodiments of the present disclosure, example seven provides a method for searching target content. The method further includes the following.

Optionally, the step of searching for the target content matching with each piece of the target search content from the subtitle information includes the step described below.

Content the same as each piece of the target search content is matched from the subtitle information and the matched content is used as the target content.

According to one or more embodiments of the present disclosure, example eight provides a method for searching target content. The method further includes the step described below.

Optionally, the target content is displayed distinctively in the subtitle information.

According to one or more embodiments of the present disclosure, example nine provides a method for searching target content. The method further includes the following.

Optionally, before the search content to be processed in the search content editing control is acquired, the method further includes the steps described below.

Voice information is determined according to a multimedia data stream; and according to the voice information, an original language type corresponding to the voice information, and a target translation language type, the subtitle information that is displayed on a target page and corresponds to the target translation language type is generated.

According to one or more embodiments of the present disclosure, example ten provides a method for searching target content. The method further includes the following.

Optionally, after the subtitle information is obtained, the method further includes the step described below.

A timestamp synchronization association relationship between the subtitle information and the multimedia data stream is established and the subtitle information and the multimedia data stream are displayed on the target page so that in the case where it is detected that one piece of the target content is triggered, a video playing moment corresponding to the one piece of the target content is jumped to.

According to one or more embodiments of the present disclosure, example eleven provides a method for searching target content. The method further includes the following.

Optionally, the step in which in the case where it is detected that the one piece of the target content is triggered, jumping to the video playing moment corresponding to the one piece of the target content includes the steps described below.

Optionally, in the case where it is detected that the one piece of the target content is triggered, a current timestamp of the one piece of the target content is determined; and the video playing moment corresponding to the current timestamp is jumped to according to the pre-established timestamp synchronization association relationship and the current timestamp.

According to one or more embodiments of the present disclosure, example twelve provides a method for searching target content. The method further includes the step described below.

Optionally, a timestamp of each piece of the target content on a timeline of a multimedia data stream is determined and a position corresponding to the timestamp on the timeline is marked.

According to one or more embodiments of the present disclosure, example thirteen provides a method for searching target content. The method further includes the steps described below.

Optionally, in the case where it is detected that one piece of the target content is triggered, a target timestamp corresponding to the one piece of the target content is determined; and a target mark corresponding to the target timestamp is displayed distinctively on the timeline.

According to one or more embodiments of the present disclosure, example fourteen provides an apparatus for searching target content. The apparatus includes a search content acquisition module, a target search content determination module, and a target content matching module.

The search content acquisition module is configured to acquire search content to be processed in a search content editing control. The target search content determination module is configured to determine at least one piece of associated content to be searched corresponding to the search content to be processed and use both the at least one piece of associated content to be searched and the search content to be processed as target search content. The target content matching module is configured to search for target content matching with each piece of the target search content from subtitle information.

In addition, although multiple operations are depicted in a particular order, this should not be construed as requiring that such operations should be performed in the shown particular order or in a sequential order. In certain circumstances, multitasking and parallel processing may be advantageous. Similarly, although implementation details are included in the preceding discussion, these should not be construed as limiting the scope of the present disclosure. Some features described in the context of separate embodiments may also be implemented in combination in a single embodiment. Conversely, various features described in the context of a single embodiment may also be implemented in multiple embodiments individually or in any suitable subcombination.

What is claimed is:

1. A method for searching target content, executed by an electronic device, comprising:
in response to detecting that an operation for starting a search is triggered, acquiring search content to be processed in a search content editing control on a target page;
determining at least one piece of associated content to be searched corresponding to the search content to be processed and using both the at least one piece of associated content to be searched and the search content to be processed as pieces of target search content, wherein the at least one piece of associated content to be searched is obtained according to at least one conversion form corresponding to the at least one piece of associated content to be searched; and
searching for target content matching with each piece of the target search content from subtitle information,
wherein determining the at least one piece of associated content to be searched corresponding to the search content to be processed comprises:
determining a content type of the search content to be processed, wherein the content type comprises a digital type and a foreign language type; and
determining the at least one piece of associated content to be searched corresponding to the search content to be processed according to the content type and content to be converted corresponding to the content type;
wherein before the search content to be processed in the search content editing control is acquired, the method further comprises:
determining voice information according to a multimedia data stream;
generating subtitle information that is displayed on the target page and corresponds to the target translation language type according to the voice information, an original language type corresponding to the voice information, and a target translation language type corresponding to the voice information;
establishing a timestamp synchronization association relationship between the subtitle information and the multimedia data stream;
displaying the subtitle information and the multimedia data stream on the target page; and
in response to detecting that one piece of the target content is triggered, navigating to a multimedia playback position corresponding to the one piece of the target content.

2. The method of claim 1, wherein acquiring the search content to be processed in the search content editing control comprises:
in a case where it is detected that a control for starting a search is triggered, acquiring the search content to be processed that is edited in the search content editing control; or
in a case where it is detected that the search content editing control is triggered, acquiring the search content to be processed that is edited in the search content editing control.

3. The method of claim 1, wherein in a case where the content type comprises the digital type, determining the at least one piece of associated content to be searched corresponding to the search content to be processed according to the content type and the content to be converted corresponding to the content type comprises:
acquiring content to be converted corresponding to the digital type in the search content to be processed;
determining at least one conversion form corresponding to the content to be converted and determining content to be replaced corresponding to the content to be converted according to the at least one conversion form; and
determining the at least one piece of associated content to be searched corresponding to the search content to be processed according to the content to be replaced and the search content to be processed.

4. The method of claim 1, wherein
the foreign language type is a preset language type; and
determining the at least one piece of associated content to be searched corresponding to the search content to be processed according to the content type and the content to be converted corresponding to the content type comprises:

acquiring content to be converted corresponding to the preset language type in the search content to be processed;

determining content to be replaced corresponding to the content to be converted, wherein the content to be replaced comprises at least one of a root word or an extended word corresponding to the content to be converted; and determining the at least one piece of associated content to be searched corresponding to the search content to be processed according to the content to be replaced and the search content to be processed.

5. The method of claim 3, wherein determining the at least one piece of associated content to be searched corresponding to the search content to be processed according to the content to be replaced and the search content to be processed comprises:

replacing the content to be converted in the search content to be processed with the content to be replaced to obtain the at least one piece of associated content to be searched corresponding to the search content to be processed.

6. The method of claim 4, wherein determining the at least one piece of associated content to be searched corresponding to the search content to be processed according to the content to be replaced and the search content to be processed comprises:

replacing the content to be converted in the search content to be processed with the content to be replaced to obtain the at least one piece of associated content to be searched corresponding to the search content to be processed.

7. The method of claim 1, wherein searching for the target content matching with each piece of the target search content from the subtitle information comprises:

matching content which is the same as each piece of the target search content from the subtitle information and using the matched content as the target content.

8. The method of claim 1, further comprising:

distinctively displaying the target content in the subtitle information.

9. The method of claim 1, wherein in the case where it is detected that the one piece of the target content is triggered, jumping to the video playing moment corresponding to the one piece of the target content comprises:

in the case where it is detected that the one piece of the target content is triggered, determining a current timestamp of the one piece of the target content; and jumping to the video playing moment corresponding to the current timestamp on a timeline of the multimedia data stream according to the timestamp synchronization association relationship and the current timestamp.

10. The method of claim 1, further comprising:

determining a timestamp of each piece of the target content on a timeline of a multimedia data stream and marking a position corresponding to the timestamp on the timeline.

11. The method of claim 10, further comprising:

in a case where it is detected that one piece of the target content is triggered, determining a target timestamp corresponding to the one piece of the target content; and distinctively displaying a target mark corresponding to the target timestamp on the timeline.

12. An electronic device, comprising:

at least one processor; and a storage apparatus configured to store at least one program;

wherein the at least one program, when executed by the at least one processor, causes the at least one processor to perform:

in response to detecting that an operation for starting a search is triggered, acquiring search content to be processed in a search content editing control on a target page;

determining at least one piece of associated content to be searched corresponding to the search content to be processed and using both the at least one piece of associated content to be searched and the search content to be processed as pieces of target search content, wherein the at least one piece of associated content to be searched is obtained according to at least one conversion form corresponding to the at least one piece of associated content to be searched; and searching for target content matching with each piece of the target search content from subtitle information, wherein the at least one processor is caused to determine the at least one piece of associated content to be searched corresponding to the search content to be processed in the following manners:

determining a content type of the search content to be processed, wherein the content type comprises a digital type and a foreign language type; and determining the at least one piece of associated content to be searched corresponding to the search content to be processed according to the content type and content to be converted corresponding to the content type;

wherein the at least one processor is further caused to perform:

determining voice information according to a multimedia data stream;

generating subtitle information that is displayed on the target page and corresponds to the target translation language type according to the voice information, an original language type corresponding to the voice information, and a target translation language type corresponding to the voice information;

establishing a timestamp synchronization association relationship between the subtitle information and the multimedia data stream;

displaying the subtitle information and the multimedia data stream on the target page; and in response to detecting that one piece of the target content is triggered, navigating to a multimedia playback position corresponding to the one piece of the target content.

13. The device of claim 12, wherein the at least one processor is caused to acquire the search content to be processed in the search content editing control in the following manners:

in a case where it is detected that a control for starting a search is triggered, acquiring the search content to be processed that is edited in the search content editing control; or in a case where it is detected that the search content editing control is triggered, acquiring the search content to be processed that is edited in the search content editing control.

14. The device of claim 12, wherein in a case where the content type comprises the digital type, the at least one processor is caused to determine the at least one piece of associated content to be searched corresponding to the search content to be processed according to the content type and the content to be converted corresponding to the content type in the following manners:

acquiring content to be converted corresponding to the digital type in the search content to be processed;

determining at least one conversion form corresponding to the content to be converted and determining content to be replaced corresponding to the content to be converted according to the at least one conversion form; and determining the at least one piece of associated content to be searched corresponding to the search content to be processed according to the content to be replaced and the search content to be processed.

15. The device of claim 12, wherein the foreign language type is a preset language type; and the at least one processor is caused to determine the at least one piece of associated content to be searched corresponding to the search content to be processed according to the content type and the content to be converted corresponding to the content type in the following manners:

acquiring content to be converted corresponding to the preset language type in the search content to be processed;

determining content to be replaced corresponding to the content to be converted, wherein the content to be replaced comprises at least one of a root word or an extended word corresponding to the content to be converted; and determining the at least one piece of associated content to be searched corresponding to the search content to be processed according to the content to be replaced and the search content to be processed.

16. The device of claim 14, wherein the at least one processor is caused to determine the at least one piece of associated content to be searched corresponding to the search content to be processed according to the content to be replaced and the search content to be processed in the following manners:

replacing the content to be converted in the search content to be processed with the content to be replaced to obtain the at least one piece of associated content to be searched corresponding to the search content to be processed.

17. The device of claim 15, wherein the at least one processor is caused to determine the at least one piece of associated content to be searched corresponding to the search content to be processed according to the content to be replaced and the search content to be processed in the following manners:

replacing the content to be converted in the search content to be processed with the content to be replaced to obtain the at least one piece of associated content to be searched corresponding to the search content to be processed.

18. The device of claim 12, wherein the at least one processor is caused to search for the target content matching with each piece of the target search content from the subtitle information in the following manners:

matching content which is the same as each piece of the target search content from the subtitle information and using the matched content as the target content.

19. The device of claim 12, wherein the at least one processor is further caused to:

distinctively display the target content in the subtitle information.

20. A non-transitory storage medium comprising computer-executable instructions which, when executed by a computer processor, cause the computer processor to perform:

in response to detecting that an operation for starting a search is triggered, acquiring search content to be processed in a search content editing control on a target page;

determining at least one piece of associated content to be searched corresponding to the search content to be processed and using both the at least one piece of associated content to be searched and the search content to be processed as pieces of target search content, wherein the at least one piece of associated content to be searched is obtained according to at least one conversion form corresponding to the at least one piece of associated content to be searched; and searching for target content matching with each piece of the target search content from subtitle information, wherein the computer processor is caused to determine the at least one piece of associated content to be searched corresponding to the search content to be processed in the following manners:

determining a content type of the search content to be processed, wherein the content type comprises a digital type and a foreign language type; and determining the at least one piece of associated content to be searched corresponding to the search content to be processed according to the content type and content to be converted corresponding to the content type;

wherein the computer processor is further caused to perform:

determining voice information according to a multimedia data stream;

generating subtitle information that is displayed on the target page and corresponds to the target translation language type according to the voice information, an original language type corresponding to the voice information, and a target translation language type corresponding to the voice information;

establishing a timestamp synchronization association relationship between the subtitle information and the multimedia data stream;

displaying the subtitle information and the multimedia data stream on the target page; and in response to detecting that one piece of the target content is triggered, navigating to a multimedia playback position corresponding to the one piece of the target content.

* * * * *